Figure 1:
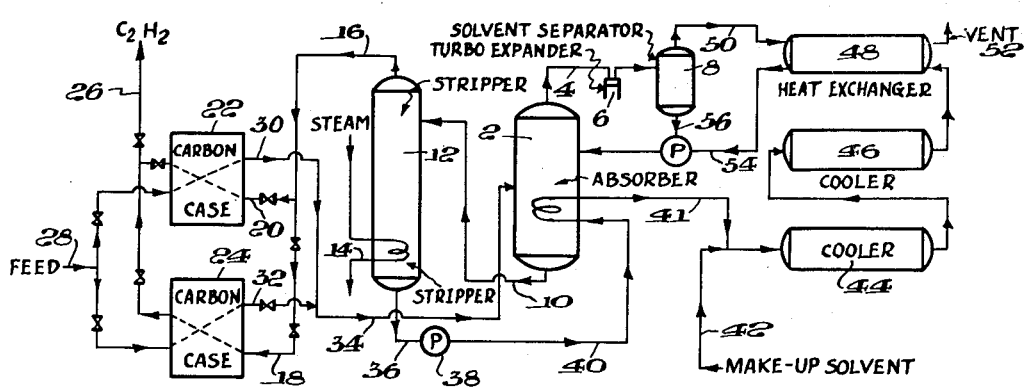

July 17, 1956 R. L. IRVINE 2,754,930
REMOVAL OF ACETYLENE COMPONENTS FROM GAS
Filed April 20, 1953 2 Sheets-Sheet 1

INVENTOR.
ROBERT L. IRVINE
BY Norman L. Wilson Jr
his ATTORNEY

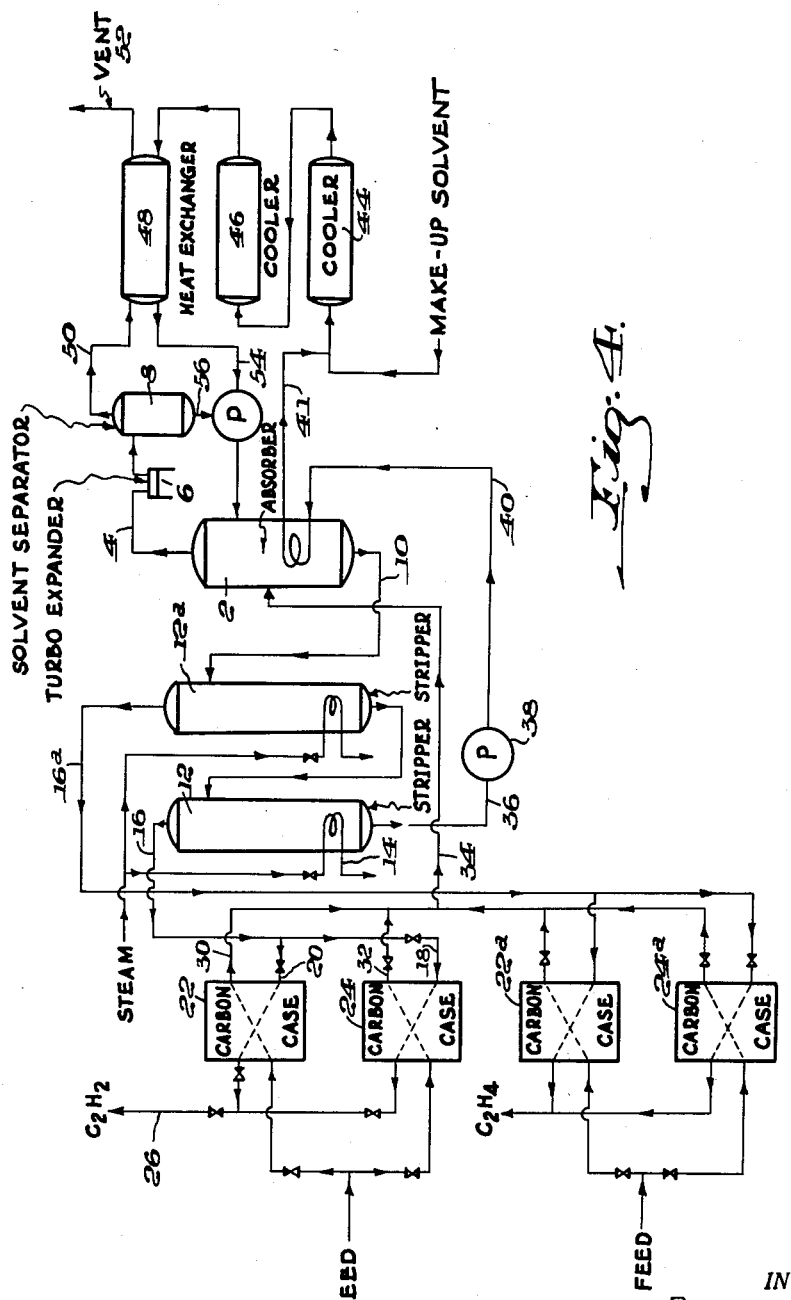

United States Patent Office 2,754,930
Patented July 17, 1956

2,754,930

REMOVAL OF ACETYLENE COMPONENTS FROM GAS

Robert L. Irvine, Pittsburgh, Pa., assignor to Koppers Company, Inc., a corporation of Delaware Application April 20, 1953, Serial No. 349,676

13 Claims. (Cl. 183—114.2)

This invention relates to the removal of an acetylene component, e. g., acetylene, acetylene and minor amounts of ethylene, and the like, from a gaseous stream containing the acetylene component.

The separation of acetylene components from gaseous streams is of particular interest because of the importance of acetylene manufacture and because of the presence of acetylene in industrial gases, particularly in pyrolysis and refinery gases. The removal of acetylene components from these gases is a matter of vital concern. In the case of regenerative furnace gas, rich in acetylene, produced by high temperature pyrolysis of hydrocarbon materials the invention has significant application. In addition acetylene must be recovered from gaseous products obtained by cracking hydrocarbon oils at elevated temperatures, such as are obtainable in the electric arc. Further in the manufacture of butadiene, for example, for use in synthetic rubber production, the crude butadiene is generally associated with acetylene.

It is known that by distillation means acetylenes are difficult to separate from gases in admixture therewith, i. e. their gaseous component, such as ethylene, because of small differences in boiling points involved, or because the mixture exists as a constant boiling point mixture. Furthermore, acetylene is explosive in nature and normally safety measures must prevent the partial pressure of acetylene from exceeding twenty-five pounds per square inch absolute. As a result numerous methods other than distillation have been suggested for the separation of acetylene from its gaseous component. One such method is solvent extraction. By this method, for economic reasons, a volatile solvent is normally employed, for example acetaldehyde, ethyl alcohol, cyclohexanone, diethyl carbonate, methyl ethyl ketone, diethylene glycol, and dimethyl formamide. Other volatile solvents having a high degree of selectivity for acetylene are, of course, known to those skilled in the art, a volatile solvent being defined as a solvent having a boiling point at atmospheric pressure of less than 300° F. Volatile solvents for acetylene, e. g. acetone, have been found to be selective in absorbing many times their volume in acetylene. In addition volatile solvents are especially preferred from the point of heat economy because of ease in reboiling, i. e. to separate solvent from absorbed acetylene. However althoughe these solvents are more suitable for absorption than the usual solvents which dissolve gases only in accorrdance with Raoult's law, there are certain attendant difficulties. Because of their volatility considerable quantities are carried off in liberated gaseous streams. The purification, using a volatile solvent, of gas streams having significant quantities of acetylene therefore entails considerable loss of solvent or the use of additional chemicals or other means for its removal.

By the practice of this invention a process is provided for separating acetylene from admixture with a gaseous component by the use of a volatile solvent, yet with very low solvent loss. By the practice of this invention a very efficient and economical means for removing acetylene is provided with excellent solvent recovery. In accordance with this invention an acetylene component is absorbed by a solvent in an absorber. The absorber off-gas exiting at the top of the absorber is expanded to achieve liquefaction of solvent and the expanded off-gas is conveyed to a solvent separator from which recovered solvent is returned to the absorber. The solvent containing the acetylene component, leaving the bottom of the absorber is introduced to the top of a stripper. The stripped vapor, the acetylene component saturated with solvent, is then treated to remove solvent therefrom. It is either cooled by the cold off-gas stream as described hereinafter or it is passed to one of two solid adsorbent cases alternating on stream. One adsorbs solvent while the other is regenerated with the feed stream, thus returing the solvent back to the absorber. Acetylene-free solvent from the bottom of the stripper is circulated back to the absorber.

The solvent employed in the absorber, i. e. in the acetylene extraction, should, of course, have a greater affinity for the acetylene component than for the remaining component. Thus according to an embodiment of this invention an acetylene component is removed from a gaseous stream with a volatile solvent by: contacting said gaseous feed stream under pressure with said volatile solvent to form a solvent phase containing an extract richer in acetylene than the gaseous feed stream and an off-gas stream richer in remaining gases than the gaseous feed stream; reducing the pressure on the off-gas stream to cool said stream by expansion thereby liquefying volatile solvent therein; heating the solvent phase from the acetylene extraction to strip the acetylene-rich gas therefrom as a solvent-saturated acetylene-rich stream; passing the solvent-saturated acetylene-rich gas stream thus removed over a solid adsorbent so that the volatile solvent is adsorbed thereby; passing at least part of the gaseous feed stream over said adsorbent prior to its introduction to the acetylene extraction thereby carrying volatile solvent from the surface of the adsorbent material back to the system; and conducting acetylene-free solvent from the acetylene stripping step and the liquefied solvent from the expansion step back to the acetylene extraction for further use in acetylene removal.

Figure 2:
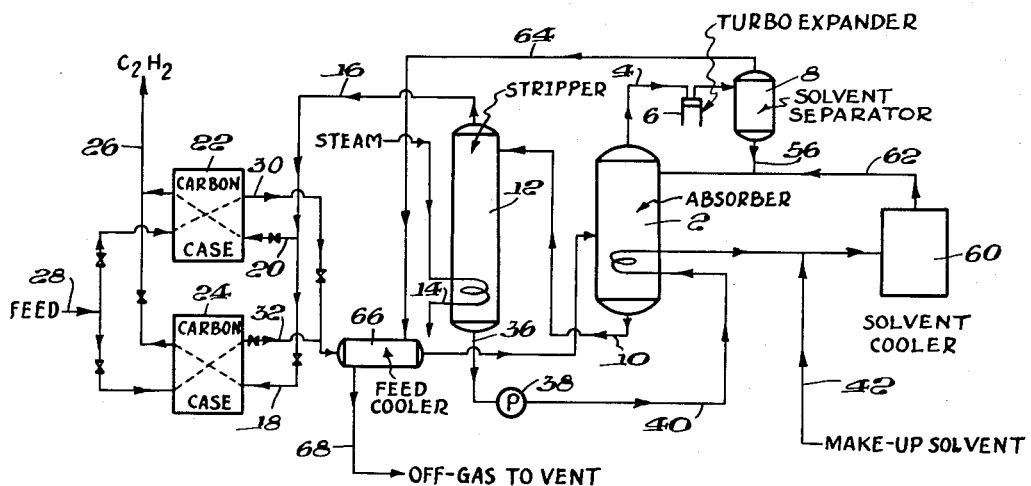
Figure 3:
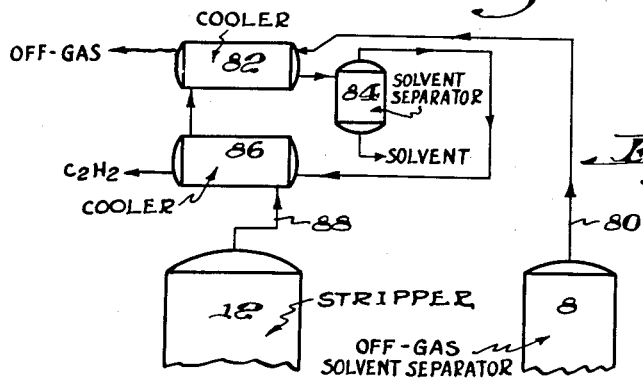

Various embodiments of the invention are shown in Figures 1, 2 and 3 of the accompanying drawings:

In Figure 1 an acetylene separation process is represented diagrammatically wherein the expanded off-gas stream partially cools the recycled solvent.

In Figure 2 an acetylene separation process is represented diagrammatically wherein the expanded off-gas stream is employed in cooling the feed gas.

In Figure 3 the expanded off-gas is used in cooling the stripped overhead vapors.

In Figure 4 a plurality of strippers and carbon cases are employed, e. g. where both ethylene and acetylene are present.

Referring to the embodiment of Figure 1 of the drawings, feed gas, from which acetylene is to be removed, flows through one of the carbon cases and through line 34 into absorber 2. The solvent is introduced into the absorption column 2 through line 54 so that there is countercurrent flow within the column. The absorption column 2 is provided with a reboiling section whereby the less soluble constituents are stripped out. The absorber off-gas exiting at 4 is expanded by means of a turbine or similar expander 6 to achieve liquefaction of the solvent. The expanded off-gas goes to solvent separator 8 from where recovered solvent is returned to absorber 2 through lines 56 and 54. The cooled off-gas stream free of solvent can then be employed as described hereinafter. The solvent phase containing an extract richer in acetylene than the feed stream, on a solvent-free basis, is conducted from the bottom of absorber 2 through line 10 to stripper 12, provided with a steam reboiler 14. In stripper 12 a separation is made between the acetylene component and the solvent. The solvent is withdrawn from the bottom of the stripper through line 36 and by means of pump 38 conducted through line 40 indirectly to supply reboiling heat to absorber 2 in its reboiling section, the solvent being partially cooled thereby. In the embodiment of Figure 1 the solvent thus partially cooled is then cooled indirectly by water and brine in exchangers 44 and 46 respectively, and then further cooled by indirect heat exchange in cooler 48 with the off-gas previously cooled by expansion in 6 as previously described. Obviously, however, any other refrigeration means can be employed in place of water and brine. The acetylene component leaving the top of stripper 12 is saturated with solvent. To remove the solvent the acetylene component is passed over a solid adsorbent selective for solvent via line 16, and 18 or 20. Two adsorbent chambers 22 and 24 are used alternating on stream. In one the solvent in the acetylene stream is adsorbed while the other is regenerated with feed gas, thus returning solvent back to absorber 12. The feed stream enters at 28 and flows through chamber 22 or 24 and through line 30 or 32, in Figure 1, to the absorption column 2 via line 34.

In the embodiment illustrated in Figure 2 the feed gas is cooled by indirect heat exchange with the expanded off-gas stream leaving separator 8. The off-gas stream leaving separator 8 passes through feed stream cooler 66 and to vent 68. In this modification a separate cooler 60 is used in cooling the solvent being recycled to absorber 2. The other corresponding parts in Figure 2 are numbered as in Figure 1. In either process fresh solvent is added at 42 as necessary.

By way of example acetone enters the upper part of an absorber and countercurrently absorbs acetylene from a feed stream. The overhead absorber off-gas which is saturated with solvent and which contains less soluble materials exits at approximately 115 p. s. i. a. and 20° F. This overhead off-gas passes through an entrainment remover and is expanded adiabatically to 20 p. s. i. a. to achieve a temperature of −100° F. thereby bringing about liquefaction of the acetone solvent by internal refrigeration. The expanded off-gas is then passed to a solvent separator and the recovered solvent is returned to the top of the absorber. The solvent containing the acetylene product, leaving the bottom of the absorber at 50° F. is introduced to the top of a stripper operating at 20 p. s. i. a. provided with a steam reboiler. The stripped vapor i. e. the acetylene product saturated with acetone, passes to either of two activated carbon cases alternating on stream. One absorbs acetone while the other is regenerated with feed gas thus returning acetone back to the absorber. The acetylene-free acetone from the bottom of the stripper is circulated back to the absorber after heat exchange with: the absorber reboiler; cooling water which cools the solvent to 90° F.; refrigerated brine which cools the solvent to 26° F. and the expanded absorber off-gas which cools the solvent to 15° F.

In one embodiment of this invention even the solvent adsorption cases can be omitted. In this instance the overhead vapors from the stripper are cooled by cold off-gas to liquefy the solvent in the overhead streams (see Figure 3). In proceeding in accordance with this modification the off-gas stream, previously cooled by expansion, and free of solvent, is indirectly heat exchanged with the solvent-saturated acetylene-rich gas stream leaving the top of the stripper 12 wherein the separation of volatile solvent from the acetylene-rich gas stream is made. Once cooled by the cold off-gas stream the solvent stripper overhead gas itself is employed in precooling other vapors leaving the solvent stripper. In other words in order to remove volatile solvent from the saturated acetylene-rich gas leaving stripper 12 through line 88 (Figure 3), the stripper gas is first precooled in cooler 86 by indirect heat exchange. The stripper vapors are subsequently further cooled in cooler 82 to achieve liquefaction of solvent by indirect heat exchange with the cold expanded off-gas stream leaving solvent separator 8 through line 80. Solvent is removed from the stream thus cooled in solvent separator 84, the gaseous acetylene phase from solvent separator 84 being employed in the precooling operation, i. e. precooler 86. This embodiment of Figure 3 is claimed in divisional application Serial No. 537,388, filed September 13, 1955.

It will be understood that the absorbing column is operated under pressure so that the off-gas stream from the top of the absorber can be expanded to achieve liquefaction of the solvent. In general the absorber pressure and the expanded off-gas pressure will be controlled so that the expansion ratio is such that a temperature is produced which is sufficiently low to result in liquefaction of the volatile solvent. Normally the acetylene extraction pressure, and the expanded off-gas stream pressure will be such that the expansion ratio is in the range of 8:1 to 4:1, preferably 6:1. The turbo expander employed will be able to accommodate from three per cent to five per cent liquid. It is understood, of course, that the expansion can be brought about by means other than turbo expanders, e. g. reciprocating machines. The liquefied solvent is therefore thrown out and can be recovered in the solvent separator. The cold expanded off-gas stream can then be utilized in the refrigeration of (1) the circulating solvent stream, (2) the absorber charge after regenerating the solvent recovery cases, or (3) the stripper overhead vapors.

The absorber can be operated at a temperature in the range from below the boiling point of the solvent at operating pressure, normally at a temperature obtainable by indirect heat exchange with cooling water, to temperatures achieved by refrigeration, say −20° F. The absorber column pressure is generally an economical compromise. It must be low enough for good selectivity but high enough for solvent recovery by expansion of the off-gas, for example, from 60 to 200 pounds per square inch absolute. The stripper, on the other hand, is usually operated at the boiling point of the solvent at the reboiler. Since the operation of the stripper is determined by the explosive limit for acetylene, the pressure should be less than 30 pounds per square inch absolute.

It is understood that in addition to acetylene other gases which may be present in the acetylene component can also be recovered, that is, gases which are dissolved to any extent by the acetone along with acetylene. In these instances only additional towers are necessary for making further separation. Thus if the feed gas contains acetylene derivatives of higher molecular weight an additional tower can be inserted after the acetylene stripper. The solvent from the absorber, containing acetylenic components is conducted to a first stripper wherein the acetylene product is removed and passed over solid adsorbent cases in accordance with this invention. But the solvent phase from the bottom of the stripper instead of being cooled and returned to the absorber is sent to a second stripper wherein the acetylenic derivatives are removed as overhead products. The acetylene derivatives can be also passed over a solid adsorbent in accordance with this invention while solvent from the bottom of the second stripper is cooled and recirculated back to the absorber.

Solid adsorbents such as are employed in accordance with this invention are, of course, well known in the art, a desirable one being activated carbon. Examples of other suitable solid adsorbents are silica gel, charcoal, alumina gel, and diatomaceous earth.

The instant invention is also applicable to solvent recovery processes wherein sufficient ethylene is absorbed by the selective solvent for acetylene to warrant recovery as shown in Figure 4. In this case an additional tower 12a is also used. The selective absorbent absorbs the acetylene with a minor amount of ethylene, most of the ethylene content of the feed gas passing through the absorbent. In the first tower 12a, to which the solvent phase from the absorber is conducted, ethylene is removed as the overhead product. The solvent phase is then passed through line 16a to a second tower 12 where acetylene is removed as the overhead product. The solvent is then cooled and recycled to the absorber, and the ethylene product and acetylene product passed to separate carbon cases 22a or 24a and 22 or 24 respectively in accordance with this invention. Obviously if the feed stream also contains higher molecular weight acetylenic compounds a third column can be employed for their removal as described hereinbefore. If carbon dioxide is present in the acetylene component it can be removed along with the ethylene product from the first tower. The ethylene product containing carbon dioxide can then be passed through a selective solvent for carbon dioxide in order to obtain a purified ethylene stream.

It will be noted that according to several aspects of the invention the feed gas stream serves as a regenerating gas stream for the solvent adsorbent cases, thereby returning the solvent back to the system. Since in this invention the expansion ratio is 4:1 to 8:1, the pressure of the feed stream passing over the adsorbent to remove solvent is from four to eight times as great as the pressure of the gas from the top of the stripper from which the solvent is removed by the adsorbent. Assuming isothermal conditions the solvent will be adsorbed or desorbed in the direction of lowest partial pressure of solvent, partial pressure being, approximately, the mol fraction multiplied by the total pressure. The stripper off-gas which is saturated with respect to solvent, e. g. acetone, will give up its acetone until it reaches equilibrium with the adsorbed phase in the adsorbing medium, for example activated carbon. The absorber feed gas which contains no solvent originally, will then reactivate the activated carbon since the partial pressure of acetone in the feed gas is always maintained less than that in the adsorbed phase of the activated carbon. The solvent is thus returned to the absorbing system. The reason that the partial pressure is less, is because the bulk of the gas has had the solvent recovered by liquefaction in expansion, and the stripper off-gas is only a part of total gas stream. Since the feed gas stream will enter the carbon case at a pressure of from four to eight times as great as that of the stripper overhead gas the partial pressure of acetone in the case would normally be high and desorption would be impossible without regenerative heating. However, by this invention the driving force is accomplished without the application of heat by correspondingly reducing the mol fraction, since a large ratio of absorber feed gas to stripper off-gas is used.

While it is advantageous for obvious reasons to use feed gas to regenerate the solid adsorbent it is possible to use other gases for this purpose such as vent gas. Furthermore the vent gas is not necessarily vented to the atmosphere but, depending on its composition, may be further separated, burned or recycled to the acetylene generator, etc.

The above description and disclosure of specific embodiments are intended to be illustrative only and other embodiments may be made without departing from the spirit and the scope of this invention. Thus as disclosed hereinbefore the present invention is applicable not only to high temperature pyrolysis gases but to other industrial gases. Obviously the invention is equally applicable to acetylene charges produced by such means as distillation, absorption, or hypersorption.

I claim:

1. A process for removing an acetylene component from a gaseous stream with a volatile solvent, said solvent having a greater affinity for acetylene, which comprises contacting said gaseous feed stream under pressure with said volatile solvent to form a solvent phase containing an extract richer in acetylene than the gaseous feed stream and an off-gas stream richer in remaining gases than the gaseous feed stream; reducing the pressure on the off-gas stream to cool said stream by expansion thereby liquefying volatile solvent therein; heating the solvent phase from the acetylene extraction to strip the acetylene-rich gas therefrom as a solvent-saturated acetylene-rich stream; passing the solvent-saturated acetylene-rich gas stream thus removed over a solid adsorbent so that the volatile solvent is adsorbed thereby; passing at least part of the gaseous feed stream over said adsorbent prior to its introduction to the acetylene extraction thereby carrying volatile solvent from the surface of the adsorbent material back to the system; and conducting acetylene-free solvent from the acetylene stripping step and the liquefied solvent from the expansion step back to the acetylene extraction for further use in acetylene removal.

2. A process for removing an acetylene component from a gaseous stream with a volatile solvent, said solvent having a greater affinity for acetylene, which comprises contacting said gaseous feed stream under pressure with said volatile solvent to form a solvent phase containing an extract richer in acetylene than the gaseous feed stream and an off-gas stream richer in remaining gases than the gaseous feed stream; reducing the pressure on the off-gas stream to cool said stream by expansion thereby liquefying volatile solvent therein, the acetylene extraction pressure and the expanded off-gas pressure being controled so that the expansion ratio is such that a temperature is produced sufficiently low to result in liquefaction of the volatile solvent; heating the solvent phase from the acetylene extraction to the boiling temperature of acetylene to strip the acetylene-rich gas therefrom as a solvent-saturated acetylene-rich stream; passing the solvent-saturated acetylene-rich gas stream thus removed over a solid adsorbent so that the volatile solvent is adsorbed thereby; passing the gaseous feed stream over said adsorbent prior to its introduction to the acetylene extraction thereby carrying volatile solvent from the surface of the adsorbent material back to the system; and conducting acetylene-free solvent from the acetylene stripping step and the liquefied solvent from the expansion step back to the acetylene extraction for further use in acetylene removal.

3. A process for removing acetylene from a gaseous stream with acetone, which comprises contacting said gaseous feed stream under pressure with said acetone to form a solvent phase containing an extract richer in acetylene than the gaseous feed stream and an off-gas stream richer in remaining gases than the gaseous feed stream but saturated with acetone; reducing the pressure on the off-gas stream to cool said stream by expansion thereby liquefying the acetone, the acetylene extraction pressure and the expanded off-gas stream pressure being such that the expansion ratio is in the range of 8:1 to 4:1, heating the solvent phase from the acetylene extraction to the boiling temperature of acetylene to strip the acetylene-rich gas therefrom as an acetone-saturated acetylene-rich stream; passing the acetone-saturated acetylene-rich gas stream thus removed over a solid adsorbent so that the acetone is adsorbed thereby; subsequently passing the gaseous feed stream over said adsorbent prior to its introduction to the acetylene extraction thereby carrying acetone from the surface of the adsorbent material back to the system; and conducting acetylene-free acetone from the acetylene stripping step and the liquefied acetone from the expansion step back to the acetylene extraction for further use in acetylene removal.

4. A process for separating acetylene from admixture with a gaseous component less soluble in a volatile solvent than acetylene which comprises countercurrently contacting said gaseous stream under pressure with a volatile solvent to form as a solvent phase an extract richer in acetylene than the gaseous feed stream and as a vapor phase an off-gas stream richer in the remaining component than the gaseous feed stream but saturated with solvent; reducing the pressure on the extraction off-gas stream to cool said stream by expansion thereby liquefying the volatile solvent, the acetylene extraction pressure and the expanded off-gas stream pressure being such that the expansion ratio is in the range of 8:1 to 4:1; heating the solvent phase from the acetylene extraction to the boiling temperature of acetylene to strip the acetylene-rich extract therefrom; passing the solvent-saturated extract stream thus removed in contact with activated carbon so that the volatile solvent is adsorbed thereby; subssequently passing the gaseous feed stream in contact with said activated carbon to desorb said volatile solvent; cooling the solvent-containing feed stream by indirect heat exchange with the expansion cooled off-gas stream; conducting said cooled feed gas stream to the acetylene extraction; cooling the acetylene-free volatile solvent from the acetylene stripping step; and reintroducing the volatile solvent thus cooled, and volatile solvent from the off-gas expansion cooling step back to the acetylene extraction for use in acetylene removal.

5. A process for separating acetylene from admixture with a gaseous component less soluble in a volatile solvent than acetylene which comprises countercurrently contacting said gaseous stream under pressure with said volatile solvent to form as a solvent phase, volatile solvent containing an extract richer in acetylene than the gaseous feed stream, and as a vapor phase an off-gas stream richer in the remaining component than the gaseous feed stream; heating the solvent phase from the acetylene extraction to the boiling temperature of acetylene to strip the acetylene-rich extract therefrom; passing the solvent-saturated extract stream thus removed over and in contact with activated carbon so that the volatile solvent is adsorbed thereby; passing the gaseous feed stream in contact with said activated carbon prior to its introduction to the extraction process thereby carrying volatile solvent from the surface of the carbon back into the system; supplying reboiler heat to the volatile solvent extraction process indirectly from the heated acetylene-free volatile solvent, said volatile solvent being partially cooled thereby; reducing the pressure on the extraction off-gas stream to cool said stream by expansion thereby liquefying the volatile solvent, the acetylene extraction pressure and the expanded off-gas pressure being controlled so that the expansion ratio is such that a temperature is produced sufficiently low to result in liquefaction of the volatile solvent; further cooling the acetylene-free volatile solvent by indicet heat exchange with the off-gas stream thus cooled; and reintroducing the solvent thus cooled and solvent from the off-gas expansion cooling step back to the acetylene extraction for use in acetylene removal.

6. A process for separating acetylene from admixture with a gaseous component less soluble in acetone than acetylene which comprises countercurrently contacting said gaseous stream under pressure with acetone to form as a solvent phase acetone containing an extract richer in acetylene than the gaseous feed stream and as a vapor phase an off-gas stream richer in the remaining component than the gaseous feed stream; reducing the pressure on the extraction off-gas stream to cool said stream by expansion thereby liquefying the acetone, the acetylene extraction pressure and the expanded off-gas stream pressure being such that the expansion ratio is in the range of 8:1 to 4:1; heating the solvent phase from the acetylene extraction to the boiling temperature of acetylene to strip the acetylene-rich extract therefrom; passing the acetone-saturated extract stream thus removed in contact with activated carbon so that the acetone is adsorbed thereby; subsequently passing the gaseous feed stream in contact with said activated carbon to desorb said acetone; cooling the acetone-containing feed stream by indirect heat exchange with the expansion cooled off-gas stream; conducting said cooled feed gas stream to the acetylene extraction; cooling the acetylene-free acetone from the acetylene stripping step; and reintroducing the acetone thus cooled, and acetone from the off-gas expansion cooling step back to the acetylene extraction for use in acetylene removal.

7. A process for separating acetylene from admixture with a gaseous component less soluble in acetone than acetylene which comprises countercurrently contacting said gaseous stream under pressure with acetone to form as a solvent phase acetone containing an extract richer in acetylene than the gaseous feed stream and as a vapor phase an off-gas stream richer in the remaining component than the gaseous feed stream; heating the solvent phase from the acetylene extraction to the boiling temperature of acetylene to strip the acetylene-rich extract therefrom; passing the acetone-saturated extract stream thus removed in contact with activated carbon so that the acetone is absorbed thereby; passing the gaseous feed stream in contact with said activated carbon prior to its introduction to the extraction process thereby carrying acetone from the surface of the carbon back into the system; supplying reboiler heat to the acetone extraction process indirectly from the heated acetylene-free acetone, said acetone being partially cooled thereby; reducing the pressure on the extraction off-gas stream to cool said stream by expansion thereby liquefying the acetone, the acetylene extraction pressure and the expanded off-gas stream pressure being such that the expansion ratio is in the range of 8:1 to 4:1; further cooling the acetylene-free acetone by indirect heat exchange with the off-gas stream thus cooled; and reintroducing the acetone thus cooled and acetone from the off-gas expansion cooling step back to the acetylene extraction for use in acetylene removal.

8. A process for separating acetylene from admixture with a gaseous component less soluble in acetone than acetylene which comprises countercurrently contacting said gaseous stream at a temperature from −20° to a temperature not exceeding the boiling point of acetone and at a pressure of from 60 pounds per square inch absolute to 200 pounds per square inch absolute under pressure with acetone to form as a solvent phase acetone containing an extract richer in acetylene than the gaseous feed stream and as a vapor phase an off-gas stream richer in the remaining component than the gaseous feed stream; reducing the pressure on the extraction off-gas stream to cool said stream by expansion thereby liquefying the acetone, the acetylene extraction pressure and the expanded off-gas stream pressure being such that the expansion ratio is 6:1; heating the solvent phase from the acetylene extraction to the boiling temperature of acetylene to strip the acetylene-rich extract therefrom; passing the acetone-saturated extract stream thus removed in contact with activated carbon so that the acetone is adsorbed thereby; subsequently passing the gaseous feed stream in contact with said activated carbon to desorb said acetone; cooling the acetone-containing feed stream by indirect heat exchange with the expansion cooled off-gas stream; conducting said cooled feed gas stream to the acetylene extraction; cooling the acetylene-free acetone from the acetylene stripping step; and reintroducing the acetone thus cooled, and acetone from the off-gas expansion cooling step back to the acetylene extraction for use in acetylene removal.

9. A process for separating acetylene from admixture with a gaseous component less soluble in acetone than acetylene which comprises countercurrently contacting said gaseous stream at a temperature from —20° to a temperature not exceeding the boiling point of acetone and at a pressure of from 60 pounds per square inch absolute to 200 pounds per square inch absolute under pressure with acetone to form as a solvent phase acetone containing an extract richer in acetylene than the gaseous feed stream and as a vapor phase an off-gas stream richer in the remaining component than the gaseous feed stream; heating the solvent phase from the acetylene extraction to the boiling temperature of acetylene to strip the acetylene-rich extract therefrom; passing the acetone-saturated extract stream thus removed in contact with activated carbon so that the acetone is adsorbed thereby; passing the gaseous feed stream in contact with said activated carbon prior to its introduction to the extraction process thereby carrying acetone from the surface of the carbon back into the system; supplying reboiler heat to the acetone extraction process indirectly from the heated acetylene-free acetone, said acetone being partially cooled thereby; reducing the pressure on the extraction off-gas stream to cool said stream by expansion thereby liquefying the acetone, the acetylene extraction pressure and the expanded off-gas stream pressure being such that the expansion ratio is 6:1; further cooling the acetylene-free acetone by indirect heat exchange with the off-gas stream thus cooled; and reintroducing the acetone thus cooled and acetone from the off-gas expansion cooling step back to the acetylene extraction for use in acetylene removal.

10. A process for separating acetylene from admixture with a gaseous component less soluble in dimethyl formamide than acetylene which comprises countercurrently contacting said gaseous stream under pressure with dimethyl formamide to form as a solvent phase dimethyl formamide containing an extract richer in acetylene than the gaseous feed stream and as a vapor phase an off-gas stream richer in the remaining component than the gaseous feed stream; reducing the pressure on the extraction off-gas stream to cool said stream by expansion thereby liquefying the dimethyl formamide, the acetylene extraction pressure and the expanded off-gas stream pressure being such that the expansion ratio is in the range of 8:1 to 4:1; heating the solvent phase from the acetylene extraction to the boiling temperature of acetylene to strip the acetylene-rich extract therefrom; passing the formamide-saturated extract stream thus removed, over and in contact with silica gel so that the dimethyl formamide is adsorbed thereby; subsequently passing the gaseous feed stream in contact with said silica gel to desorb said dimethyl formamide; cooling the dimethyl formamide-containing feed stream by indirect heat exchange with the expansion cooled off-gas stream; conducting said cooled feed gas stream to the acetylene extraction; cooling the acetylene-free dimethyl formamide from the acetylene stripping step; and reintroducing the dimethyl formamide thus cooled, and dimethyl formamide from the off-gas expansion cooling step back to the acetylene extraction for use in acetylene removal.

11. A process for separating acetylene from admixture with a gaseous component less soluble in acetaldehyde than acetylene which comprises countercurrently contacting said gaseous stream under pressure with acetaldehyde to form as a solvent phase acetaldehyde containing an extract richer in acetylene than the gaseous feed stream and as a vapor phase an off-gas stream richer in the remaining component than the gaseous feed stream; heating the solvent phase from the acetylene extraction to the boiling temperature of acetylene to strip the acetylene-rich extract therefrom; passing the acetaldehyde-saturated extract stream thus removed in contact with alumina gel so that the acetaldeheyde is adsorbed thereby; passing the gaseous feed stream in contact with said alumina gel prior to its introduction to the extraction process thereby carrying acetaldehyde from the surface of the alumina gel back into the system; supplying reboiler heat to the acetaldehyde extraction process indirectly from the heated acetylene-free acetaldehyde, said acetaldehyde being partially cooled thereby; reducing the pressure on the extraction off-gas stream to cool said stream by expansion thereby liquefying the acetaldehyde, the acetylene extraction pressure and the expanded off-gas stream pressure being such that the expansion ratio is in the range of 8:1 to 4:1; further cooling the acetylene-free acetaldehyde by indirect heat exchange with the off-gas stream thus cooled; and reintroducing the acetaldehyde thus cooled and acetaldehyde from the off-gas expansion cooling step back to the acetylene extraction for use in acetylene removal.

12. A process for separating acetylene from admixture with a gaseous component less soluble in acetone than acetylene which comprises countercurrently contacting said gaseous stream with acetone in an absorber operating at a temperature from —20° F. to a temperature not exceeding the boiling point of acetone and at pressure of from 60 pounds per square inch absolute to 200 pounds per square inch absolute, to form as a solvent phase acetone containing an extract richer in acetylene than the gaseous feed stream and as a vapor phase an off-gas stream richer in the remaining component than the gaseous feed stream; reducing the pressure on the off-gas stream to cool said stream by expansion thereby liquefying the acetone, the acetylene extraction pressure and the expanded off-gas pressure being such that the expansion ratio is 6:1; conveying solvent thus liquefied back to the absorber; conducting the solvent phase from the acetylene extraction absorber to a stripper wherein a separation is made between acetylene and acetone; passing the acetone-saturated acetylene from the top of said stripper over and in contact with activated carbon to remove acetone therefrom; subsequently passing the gaseous feed stream over said activated carbon, prior to introducing said feed stream to the absorber, to remove acetone from said activated carbon and to carry the acetone back to the absorber; conveying the heated solvent from the bottom of the stripping column through the reboiling section of the solvent extraction column indirectly to supply reboiling heat thereto, thereby cooling said solvent stream; further cooling said solvent stream by indirect heat exchange with the off-gas stream previously cooled by expansion after leaving the top of the absorber; and reconveying the solvent thus cooled to the absorber.

13. A process for separating acetylene and ethylene from admixture with a gaseous component less soluble in acetone than the acetylene-ethylene component which comprises countercurrently contacting said gaseous stream under pressure with acetone to form as a solvent phase acetone containing an extract richer in the acetylene-ethylene component than the gaseous feed stream and as a vapor phase an off-gas stream richer in the remaining component than the gaseous feed stream; heating the solvent phase from the acetylene-ethylene extraction to the boiling temperature of ethylene to strip ethylene therefrom leaving a solvent containing acetylene; subsequently heating the solvent containing acetylene to strip the acetylene therefrom; passing the acetone-saturated ethylene stream and the acetone-saturated acetylene stream thus separated in contact with separate quantities of activated carbon so that acetone is adsorbed from each stream; subsequently passing the gaseous feed stream in contact with each quantity of activated carbon prior to its introduction to the extraction process thereby carrying acetone from the surface of the activated carbon back into the system; supplying reboiler heat to the acetone extraction process indirectly from the heated acetylene-ethylene-free acetone, said acetone being partially cooled thereby; reducing the pressure on the extraction off-gas stream to cool said stream by expansion thereby liquefying the acetone, the acetylene-ethylene extraction pressure and the expanded off-gas stream pressure being such that the expansion ratio is in the range of 8:1 to 4:1; further cooling the acetylene-ethylene-free acetone by indirect heat exchange with the off-gas stream thus cooled; and reintroducing the acetone thus cooled and acetone from the off-gas expansion cooling step back to the acetylene extraction for use in removal of the acetylene-ethylene component.

References Cited in the file of this patent

UNITED STATES PATENTS

| | | |
|---|---|---|
| 1,989,273 | Grimme et al. | Jan. 29, 1935 |
| 2,146,448 | Scott et al. | Feb. 7, 1939 |
| 2,180,496 | Balcar | Nov. 21, 1939 |
| 2,236,964 | Babcock | Apr. 1, 1941 |
| 2,241,716 | Roberts et al. | May 13, 1941 |
| 2,241,717 | Robinson et al. | May 13, 1941 |
| 2,250,925 | Babcock | July 29, 1941 |

FOREIGN PATENTS

| | | |
|---|---|---|
| 331,610 | Great Britain | July 10, 1930 |
| 494,053 | Belgium | Mar. 15, 1950 |
| 570,648 | Great Britain | July 17, 1945 |